United States Patent

Schultz

[15] 3,675,725

[45] July 11, 1972

[54] DISC IMPLEMENT

[72] Inventor: Henry F. Schultz, Route 1, Welcome, Minn. 56181

[22] Filed: May 27, 1970

[21] Appl. No.: 40,848

[52] U.S. Cl. ............................172/245, 172/383, 172/413, 172/569, 172/576, 172/669, 280/415
[51] Int. Cl. ...............A01b 63/22, A01b 21/08, A01b 23/04
[58] Field of Search..................172/569, 581, 574, 576, 582, 172/579, 586, 595, 584, 603, 580, 240

[56] References Cited

UNITED STATES PATENTS

| 1,815,330 | 7/1931 | Robinson | 172/240 |
| 1,822,920 | 9/1931 | Burman | 172/240 |
| 2,696,772 | 12/1954 | Underwood | 172/240 |

*Primary Examiner*—Robert E. Pulfrey
*Assistant Examiner*—C. W. Hanor
*Attorney*—Williamson, Palmatier & Bains, George F. Williamson, H. Dale Palmatier and Herman H. Bains

[57] ABSTRACT

A disc implement includes a frame having retractable transport wheels thereon and having a plurality of tool bars fixedly mounted thereon. These tool bars each include tool bar sections extending laterally from the longitudinal center line of the implement and extending substantially normal to the direction of draft or travel of the implement. Each tool bar section has a plurality of spaced apart concavo-convex discs connected thereto by vertically arranged tool standards, the tool standards being rotatable about their respective longitudinal axes to selectively change the angle of the disc with respect to the direction of draft of the implement. A linkage mechanism is interconnected to the tool standards to selectively shift the same by a hydraulic ram. The discs on one side of the frame are oppositely angled with respect to the discs on the other side of the frame to thereby substantially balance the side draft during operation of the implement.

3 Claims, 9 Drawing Figures

INVENTOR.
HENRY SCHULTZ
BY
Williamson, Palmatier
& Bains ATTORNEYS

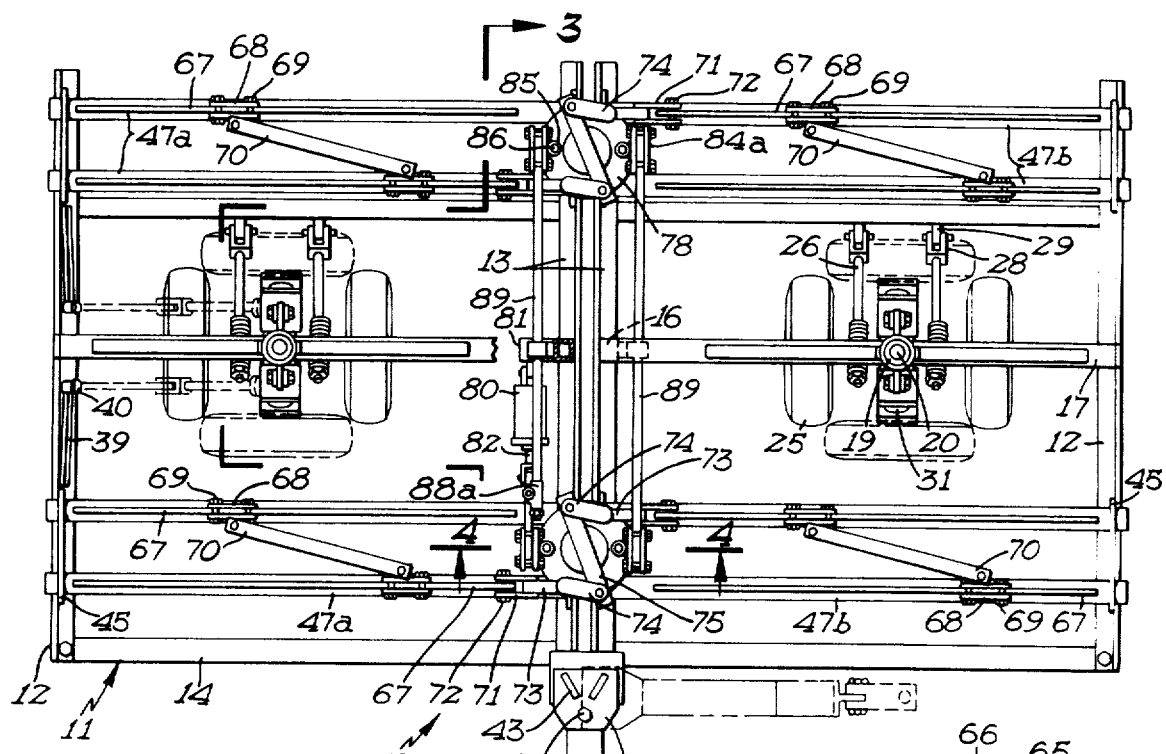
Fig 2
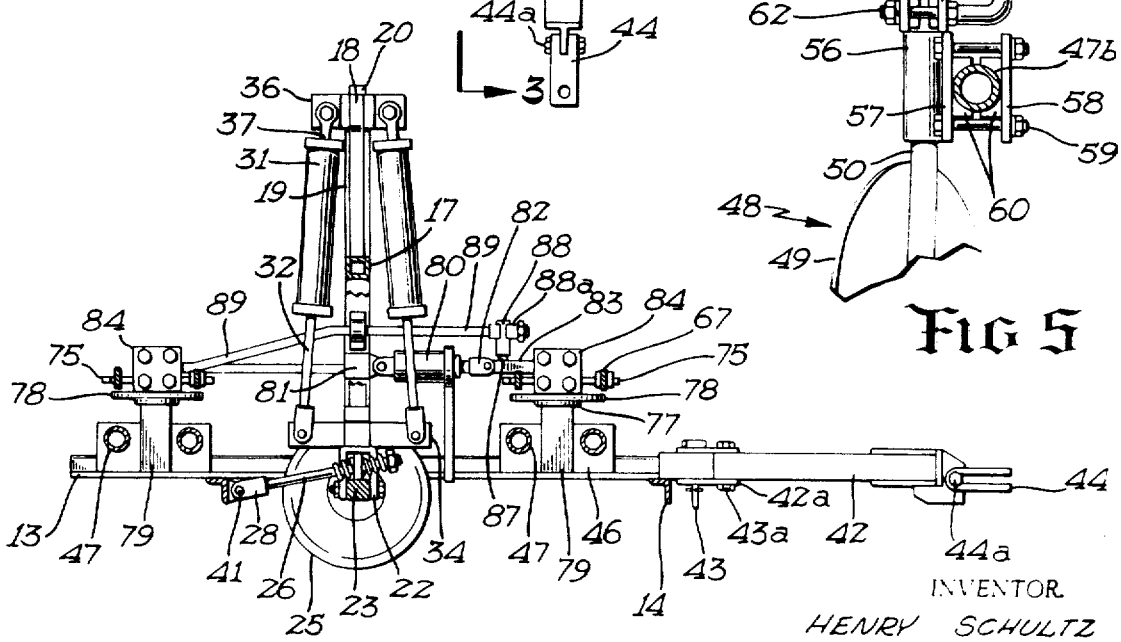
Fig 3
Fig 5
INVENTOR.
HENRY SCHULTZ
BY Williamson, Palmatier
& Bains ATTORNEYS

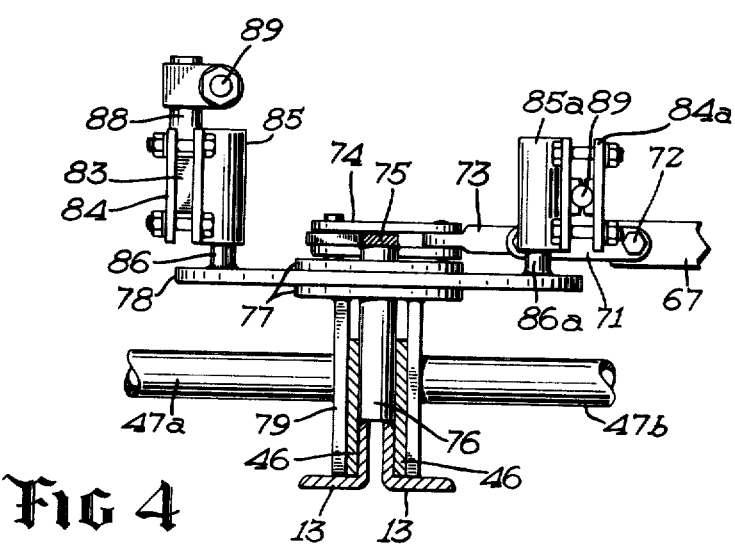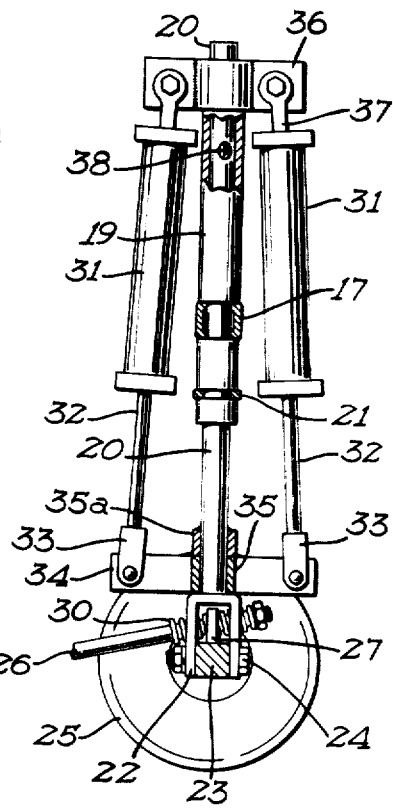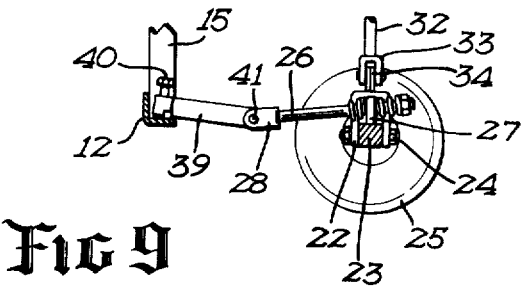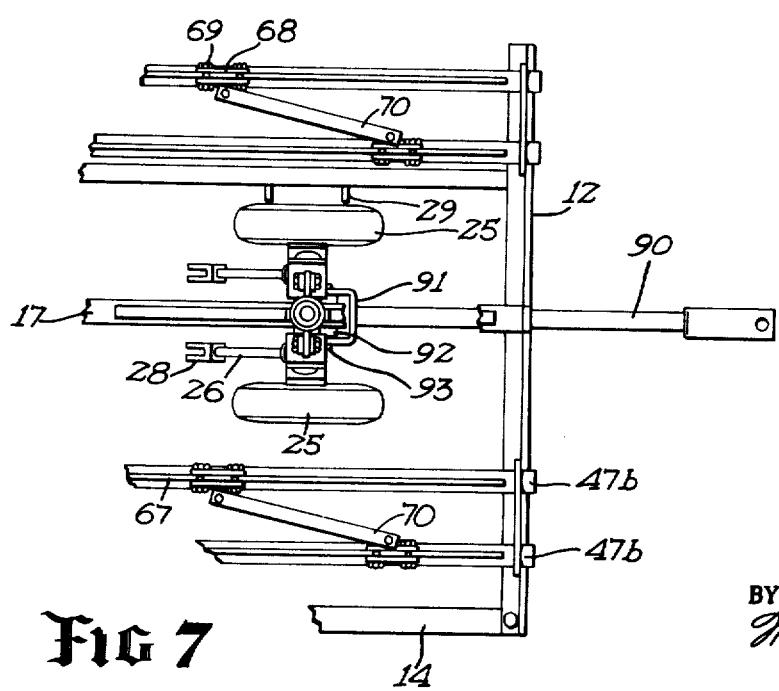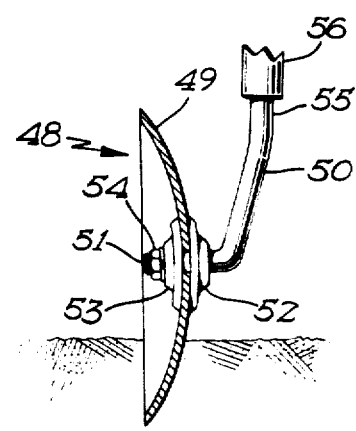

DISC IMPLEMENT

SUMMARY OF THE INVENTION

An object of this invention is to provide a disc implement in which the frame, including the tool bars remains fixed, but the discs and disc standards are shiftable to permit selective adjustment of the angulated relation of the disc with respect to the direction of draft.

This is accomplished by shiftably mounting the disc standards on the tool bars and providing motion transmitting linkage for shifting the tool standards. Power shifting is accomplished through the use of a fluid pressure motor or ram.

The discs disposed on one side of the longitudinal center line of the frame are oppositely angled with respect to the discs located on the other side of the frame. With this arrangement, the side draft exerted by the angularly disposed discs is substantially balanced during operation of the implement.

The tool standards are slightly bent from a substantially straight configuration so that a force is exerted on the circumferential edge portion of the disc. This particular construction of the tool standard produces a self-cleaning and self-sharpening effect on the discs during operation of the implements.

Suitable retractable and extensible transport wheels are provided to facilitate movement of the implement from one location to another. These and other objects and advantages of this invention will more fully appear from the following description made in connection with the accompanying drawings wherein like reference characters refer to the same or similar parts throughout the several views.

BRIEF DESCRIPTION OF THE FIGURES OF THE DRAWINGS

FIG. 2 is a top plan view thereof with certain parts thereof omitted for clarity and other parts illustrated in a different position by dotted line configuration;

FIG. 3 is a cross-sectional view taken approximately along line 3—3 of FIG. 2 and looking in the direction of the arrows;

FIG. 4 is a cross-sectional view taken approximately along line 4—4 of FIG. 2 and looking in the direction of the arrows;

FIG. 5 is a fragmentary cross-sectional view of the implement illustrating the manner in which a tool standard for a disc is mounted on a tool bar;

FIG. 6 is a fragmentary cross-sectional view of a disc illustrating the details of construction of a tool standard;

FIG. 7 is a fragmentary top plan view of one end poriton of the implement illustrating the position of the transport wheels in the tranSport position;

FIG. 8 is a cross-sectional view taken approximately along line 8—8 of FIG. 2 and looking in the direction of the arrows; and FIG. 9 is a fragmentary cross-sectional view illustrating the position of the rear transport wheels when the wheels are in a transport position.

DETAILED DESCRIPTION OF THE INVENTION

Figure 1:
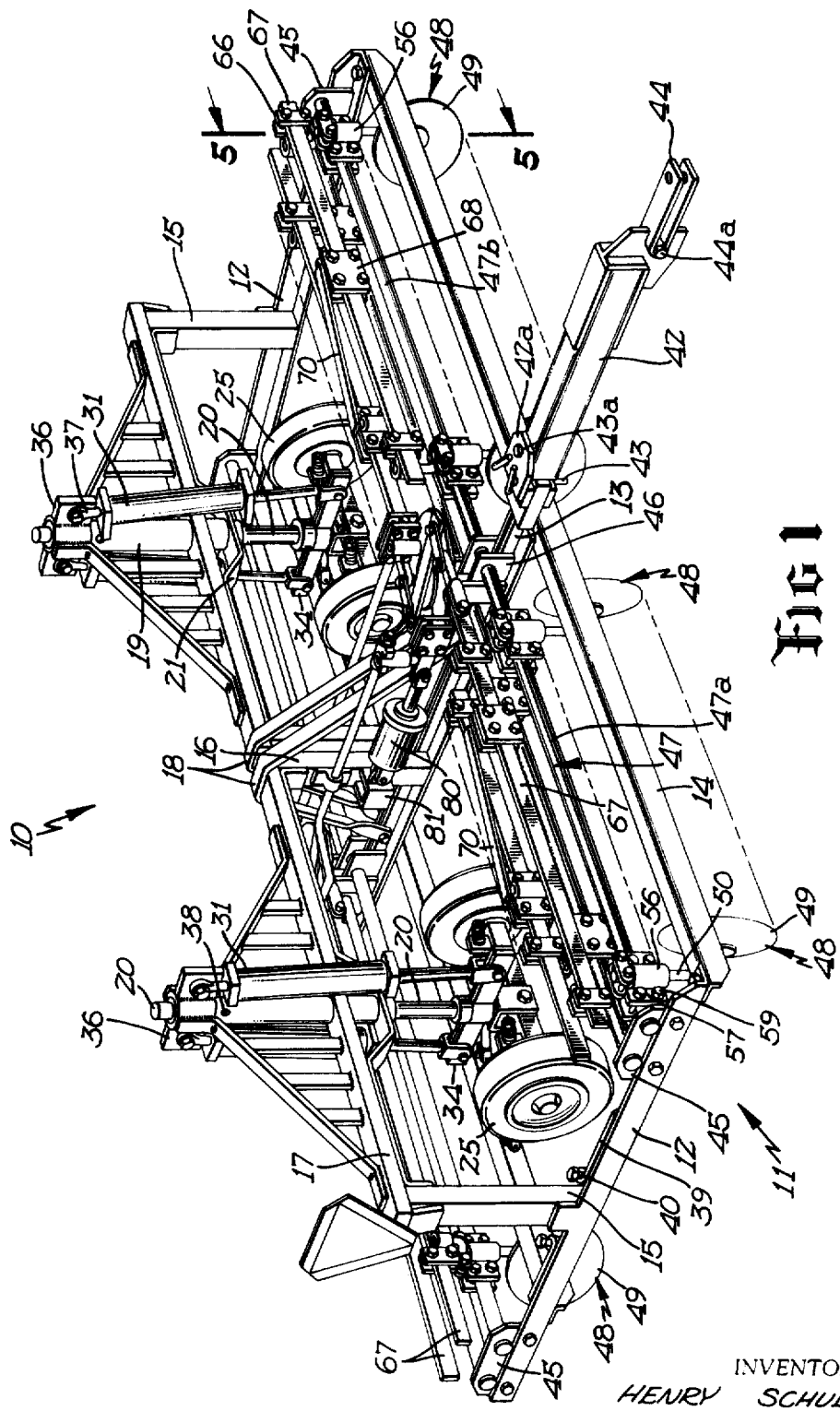
FIG. 1 is a perspective view of the novel disc implement.

Referring now to the drawings and more specifically to FIG. 1, it will be seen that one embodiment of my novel disc implement, designated generally by the reference numeral 10, is there shown. This disc implement 10 includes an implement frame 11 which, as shown, is of generally rectangular configuration. The frame includes elongate longitudinal side frame members 12 and longitudinal central frame members 13 which are rigidly connected by transverse frame members 14. The two longitudinal central frame members are disposed in close proximal spaced apart relation by suitable spacers and are rigidly interconnected together by suitable nut and bolt assemblies (not shown). It is also pointed out that each transverse frame member 14 is rigidly interconnected to a central and a side frame member so that, in effect, two frame sections are provided.

Referring again to FIG. 1, it will be seen that each of the longitudinal side frame members has a side post 15 rigidly attached thereto and projecting upwardly therefrom. The frame is also provided with a pair of central posts 16 which are rigidly affixed to the longitudinal central frame members 13 adjacent the mid-portion thereof and projecting upwardly therefrom. A pair of upper transverse frame members 17 are provided, each having one end secured to one of the side posts 15 and having its other end secured to one of the central posts 16. Suitable reinforcing straps 18 are secured to the inner end portions of the upper transverse frame members 17 and to the longitudinal central frame members 13 as best seen in FIG. 1.

It will be seen that each of the upper transverse frame members 17 has an opening therein intermediate the ends thereof and that a vertically oriented guide sleeve 19 projects through the opening and is rigidly affixed to the associated transverse frame member 17. Each sleeve 19 accommodates an elongate wheel standard 20 therein, the wheel standard having a U-shaped lower end 22, as best seen in FIG. 8. It will also be noted that each sleeve 19 also projects through and is rigidly affixed to a reinforcing strap 21 which in turn is secured to the lower surface of the associated upper transverse frame member 17.

The bifurcated or U-shaped lower end 22 of each standard 20 is pivotally connected to a transverse bar 23 by means of a pivot nut and bolt assembly 24. It will be noted that opposite ends of the transverse bar 23 has a pair of ground engaging transport wheels or wheel assembly 25 journalled thereon.

It will also be noted that each of the transverse bars 23 has a pair of apertured brackets 27 affixed thereto and projecting upwardly therefrom. Each of these brackets has an elongate stabilizing rod 26 projecting therethrough, one end of the stabilizing rod being bifurcated as at 28 and secured to an ear 29 affixed to a transverse frame member 14. It will be noted that there are two wheel assemblies and each wheel assembly has a pair of stabilizing rods associated therewith. Each stabilizing rod also has a pair of springs positioned on opposite sides of the associated bracket 27 and these springs are retained longitudinally on the rods by suitable collars secured thereto. Thus it will be seen that the springs 30 tend to resist longitudinal movement of the stabilizing rod.

Means are provided for extending and retracting the transport wheels between elevated or retracted inoperative position and a lowered extended transport position. To this end, it will be seen that a pair of hydraulic cylinders 31 are provided, each having a piston moveable therein to which is connected an elongate piston rod 32. Each piston rod 32 is bifurcated at its lower end and is pivotally secured to a cross arm 34, the latter being secured to a sleeve 35 which is positioned concentrically around the wheel standard 20. The wheel standard 20 also has a collar 35a fixedly secured to the standard and positioned against the collar 35. It will further be noted that the collar 35 bears against the bifurcated lower end portion of the wheel standard. Thus, extension and retraction of the piston rods produces vertical translation of the wheel standard 20 for each ground engaging wheel assembly.

It will be noted that the upper end of the sleeve 19 for each wheel assembly has a bracket 36 secured thereto and projecting outwardly therefrom. Each hydraulic cylinder 31 also has a bracket 37 secured to its upper end which in turn is secured to the bracket 36. The cylinders are double acting hydraulic cylinders and suitable conduits will interconnect the cylinders to a source of hydraulic fluid under pressure. Suitable control valves will also be provided which may be operated from the tractor which tows the disc implement. It is also pointed out that the sleeve 19 has an aperture 38 therein which will accommodate a locking pin to lock each wheel standard down in a lowered transport position.

The disc implement 10 is adapted to be towed by a prime mover such as a tractor and to this end, the implement is provided with an elongate drawbar 42 which is pivotally connected at one of the ends by a pivot pin 43a to upper and lower plates 42a which are rigidly affixed to the central portion of the frame 11. Suitable locking pins 43 lock the drawbar 42 in forwardly projecting relation with respect to the frame.

A clevis type hitch 44 is pivotally connected to the drawbar by a pivot pin 44a for vertical pivotal movement relative thereto about a horizontal transverse axis. The clevis is suitably apertured for connection to the hitch on a tractor or other vehicle.

When the disc implement 10 is being towed by a tractor during an earth working operation, the ground wheels will be retracted and will be disposed in the position illustrated in FIG. 1 and in the full line configuration of FIG. 2. However, when in the transport position, the wheels will be extended to engage the ground and to support the implement frame for travel. The wheels may also be turned 90° from the first position to a second position illustrated by dotted line configuration in FIG. 2. The wheels illustrated on the left side of FIG. 2 will function as the rear wheels and will be secured in place by the stabilizing rods 26.

Referring now to FIG. 9 and again to FIG. 2, it will be seen that the stabilizing rods will be disconnected from the associated ears 29 and each rod will be connected by pin 41 to one end of an apertured arm 39. The other end of each arm 39 is pivotally connected by a pivot bolt 40 to a longitudinal side frame member 12. The other wheel assembly will be turned about 90° about its vertical axis to be disposed in the position illustrated by the dotted line configuration of FIG. 2. A transport drawbar will be attached to the front wheel assembly in a manner to be described hereinbelow. It is also pointed out that during transport of the implement, one of the locking pins 43 for the drawbar 42 will be removed to allow the drawbar 42 to be swung to the dotted line configuration illustrated in FIG. 2.

It will be seen that the longitudinal side frame members 12 of the implement frame are each provided with a pair of outer brackets 45 which are rigidly secured thereto and project upwardly therefrom. Each of the longitudinal central frame members 13 also has a pair of longitudinally spaced apart inner brackets 46 rigidly secured thereto and projecting upwardly therefrom. Each outer bracket is disposed in aligned relation with each inner bracket and each pair of brackets accommodates a pair of elongate transversely extending tool bars 47.

In this regard, it will be noted that the tool bars 47 extend laterally outwardly from the longitudinal center line of the implement frame 11. It is pointed out that each tool bar located on one side of the longitudinal center line of the implement frame is disposed in coaxial alignment with a tool bar on the other side of the frame. It is also pointed out that each aligned pair of tool bars could be integrally formed from a single piece of metal rather than being formed into lateral sections as shown in the enclosed embodiment. Further, each tool bar section located on the left side of the implement frame as viewed in FIG. 1 is designated 47a while the aligned section on the right side of the frame of FIG. 1 is designated 47b.

Referring again to FIGS. 1, 2 and 3, it will be noted that each front pair of tool bar sections are disposed in closely spaced apart relation in a fore and aft direction with respect to each other and that the rear pairs of tool bar sections are also closely spaced apart in a fore and aft direction. These tool bar sections are of circular cross-sectional configuration and each has a plurality of disc units 48 secured thereto and depending therefrom.

Each disc unit 48 includes a concavo-convex disc 49 which is revolvably mounted on the lower end of a standard 50. In this regard, the standard 50 is provided with a laterally and horizontally projecting arm 51 upon which the associated disc 49 is journalled. The disc is secured to the arm 51 by a hub 53 which is secured on the arm by a retaining nut 54. The hubs are provided with suitable bearings for revolvably supporting the disc.

The standard 50 includes a bent lower end portion 55 which is slightly offset with respect to the upper vertical end portion of the standard. The vertical upper end portion of the standard projects through a sleeve 56 which is rigidly affixed to a clamping plate 57 as by welding or the like. The clamping plate 57 is secured to a second clamping plate 58 by suitable nut and bolt assemblies 59 to clamp the sleeve in vertically oriented relation on a tool bar section. It is pointed out that the discs 49 located on one side of the longitudinal center line of the implement frame are oppositely angled with respect to the disc on the other side of the implement frame. Actually, the axis of rotation of each disc is angularly disposed with respect to the longitudinal center line of the frame when the discs are in their normal earth working condition. In this regard, the concave side of the discs face inwardly, and, by oppositely angling the discs which are located on opposite sides of the longitudinal sides of the center line of the frame, the side draft produced by the discs during the earth working operation are substantially balanced.

Referring again to FIG. 5, it will be noted that the upper end portion of each standard 50 projects through its associated sleeve 56 and has a pair of clamp plates 61 secured thereto by suitable nut and bolt assemblies 62. One of the clamp plates 61 is rigidly affixed to one end of an L-shaped arm 63 while the other end of the L-shaped arm projects through a sleeve 64 which in turn is rigidly affixed to a clamp plate 65. The clamp plate 65 is secured to another clamp plate 66 by suitable nut and bolt assemblies which secure the sleeve 64 to a motion transmitting link 67. Longitudinal movement of the motion transmitting link 67 produces revolving movement of the standards about their vertical longitudinal axes. With this arrangement, the angulated relation of the disc may be readily changed.

It will be noted that there are four motion transmitting links for the four front tool bar sections and that there are also four motion transmitting links for the four rear tool bar sections. Means are provided for interconnecting and shifting all of the motion transmitting links simultaneously so that adjustment of all of the disc units occurs in a single action. In this regard, each fore and aft pair of motion transmitting links located on opposite sides of the longitudinal center line of the frame is interconnected by a diagonally extending connecting arm 70 which is pivotally secured at opposite ends to a clamping plate structure. This clamping plate structure includes a pair of clamping plates 68 which are rigidly secured to a motion transmitting link by nut and bolt assemblies 69. Each end of each connecting arm 70 is pivotally secured to one of the plates 68 so that movement of one of the motion transmitting links 67 is transmitted to the adjacent motion transmitting link by the associated connecting arm.

Referring now to FIG. 2, it will be noted that one motion transmitting link of each fore and aft pair has a pair of clamping plates 71 secured to the inner end portiontion thereof by nut and bolt assemblies 72. Each of these plates 71 is pivotally connected to one end of a pivot link 73, the pivot link 73 being pivotally connected at its other end to a link 74. Referring again to FIG. 2, it will be noted that the forward motion transmitting link of each fore and aft pair located on the left side of the implement frame is pivotally connected to the links 73 and 74, while the rear motion transmitting link of each fore and aft pair located on the right side of FIG. 2 is connected by the links 73 and 74.

It will be noted that each front pair of links 74 are pivotally connected at their respective inner ends to opposite ends of a crossbar 75, while the rear pair of links 74 is also pivotally connected to ends of a rear crossbar 75. Each crossbar 75 is fixedly connected to the upper end of a vertical shaft or post 76. It will be noted that each shaft 76 has a relatively large turntable or plate 78 of circular configuration journalled thereon, the turntable being positioned between a pair of small plates 77 which are secured to the shaft. The lower end portion of each shaft 76 projects downwardly between a pair of depending legs which are secured at their respective upper ends to the associated lower small plate 77. The legs are also positioned upon the central longitudinal frame members 13 and against the outer vertical sides of the central brackets 46 which are secured to the longitudinal central frame members. It will be noted that the front and rear turntables 78 are of identical construction and while being longitudinally spaced apart from each other have their axes of rotation lying within the longitudinal center line of the implement frame. The turntables comprise actuating mechanisms for the motion transmitting links or mechanisms 67.

A hydraulic cylinder of a hydraulic cylinder and piston unit is pivotally secured to a bracket 81 which, as best seen in FIG. 1, is rigidly attached to one of the central posts 16. A piston is disposed in the cylinder 80 and is secured to a piston rod 82 which projects forwardly from the cylinder and is pivotally secured to an elongate arm 83. It will be noted that the arm 83 has a pair of clamp plates 84 positioned on opposite sides thereof and secured thereto by suitable nut and bolt assemblies as best seen in FIG. 4. One of the clamp plates 84 has a sleeve 85 affixed thereto, it being noted that the sleeve is vertically oriented and positioned over a vertically projecting stud 86. Stud 86 is secured to the forward turntable 78 for movement therewith.

It will also be noted that the arm 83 which is connected to the piston rod 82 also has an upwardly projecting stud 87 secured thereto upon which is mounted a sleeve 88. The sleeve 88 has a longitudinal sleeve 88a secured thereto, as best seen in FIG. 3.

A pair of elongate longitudinally extending links 89 are provided, one of which is secured at its forward end in the sleeve 88a, while the other connecting rod 89 is connected at its forward end to a vertically oriented sleeve 85a by means of a pair of clamp plates 84a. Suitable nut and bolt assemblies clamp the plates upon the connecting rod and it will be noted that the sleeve 85a is rigidly affixed to one of these clamping plates. The sleeve 85a is also positioned upon a vertically oriented stud 86a, which is shown in FIG. 2 as diametrically opposed to the stud 86.

The rear turntable 78 also has a pair of diametrically opposed vertically arranged studs 86 affixed thereto and projecting upwardly therefrom, as best seen in FIG. 2. Each of these studs has a sleeve 85 positioned thereover, each sleeve 85 being rigidly affixed to one of a pair of clamping plates 84 which are secured by suitable nut and bolt assemblies to the rear end portion of one of the connecting rods 89. It will therefore be seen that the connecting rods 89 and the front and rear turntables actually constitute a parallelogram linkage. It will further be seen that when the piston rod 82 is extended or retracted, the angulated relation of all of the disc units will be simultaneously adjusted.

Referring now to FIG. 7, it will be seen that a transport towbar 90 is provided for towing the implement when the latter is arranged in a transport condition. This elongate transport towbar 90 is bifurcated at its rear end 91 and is pivotally connected to an eyelet 92 which is secured to the transverse bar 93 of the ground engaging wheel unit located at the right side of the implement frame illustrated in the FIG. 2. The bifurcated end 91 is secured by a pivot pin 93 to the eyelet and permits vertical pivotal movement of the towbar relative to the connected wheel unit.

In operation, the drawbar 42 will be connected to a towing vehicle and this towing vehicle may supply the hydraulic fluid for operating the cYlinders 31 and the cylinder 80. The ground engaging wheels will be retracted to the elevated inoperative position so that the disc units penetrate the ground in their earth working condition. As best seen in FIG. 1, the concave side of the implements will be facing inwardly and forwardly. The disc units on the front pair of tool bar structures will be staggered as will be the disc units on the rear pair of tool bar structures. With this arrangement, effective earth working action can be accomplished with an economy of space. In this regard, a relatively wide range of angular adjustment of the disc units is permitted, since these disc units are widely spaced apart with respect to each other. However, by staggering the disc units on adjacent fore and aft tool bars, the earth working effect is substantially the same as disc implements having closely spaced apart gangs.

The disc units on one longitudinal side of the implement frame will be oppositely angled with respect to the implements on the other longitudinal frame. Further, the disc units on the rear tool bars will be oppositely angled with respect to the disc units of the forward tool bars on the same side of the implement frame. A very effective balancing of the side draft is accomplished by this arrangement while permitting an effective earth working operation to be accomplished.

It will further be noted that the tool bars are disposed substantially normal to the direction of draft and the direction of travel and that these tool bars remain stationary. Further, simultaneous adjustment of the disc units is accomplished without requiring any adjustment of the tool bars or any other part of the frame other than the actuating linkage. This is a complete departure of the conventional arrangement in disc implements.

All of the disc units are disposed within the confines of the frame and the frame for all practical purposes is non-adjustable, as compared to the conventional disc implements. The simultaneous adjustment of all of the disc units may be accomplished by a user from the tractor by merely actuating the valve control which controls operation of the hydraulic cylinder 80. Thus the disc units may be readily adjusted by a user in accordance with the changing soil conditions. These discs may be selectively adjusted between two extreme positions. In one extreme position, the axis of rotation of the disc relative to its standard is substantially normal to the direction of travel of the implement. There will be little if any turning action when the discs are so disposed. The other extreme position is through an arc of substantially 90° so that maximum draft would be produced. In practice, the disc will be adjusted to a position between these extremes.

It is also pointed out that by utilizing the particular tool standard for each disc unit, a self-cleaning and sharpening action is effected with respect to each disc. It is thought that the offset lower end portion of each tool standard increases the pressure exerted on the peripheral edge portion of each disc as it is moved through the soil to produce the self-cleaning and self-sharpening action. It will be seen that the offset end portion of each standard constitutes a major (approximately one-half) portion of the overall length of the standard. It will also be noted that each disc unit is connected only at its upper end portion to the associated tool bar so that there is no obstruction located between adjacent discs.

When it is desirable to transport the implement from one location to another, the ground engaging wheel units will be lowered or extended by extending the piston rods 32. The implement frame will then be supported for travel over the surface of the ground by the ground engaging wheels 25 and the implement units will, of course, be disposed substantially above the surface of the ground. The stabilizing rod 26 for each ground engaging wheel unit will be disengaged from connected relation with respect to the associated transverse frame member and the wheels will be rotated 90° to assume the dotted line configuration as illustrated in FIG. 2. The stabilizing rods for the wheels located at the left side of FIG. 2 will be connected to the arms 39 on the associated longitudinal side frame member 12 so that this wheel unit will be releasably locked in place in its transport position. The wheel unit located at the right, as viewed in FIG. 2, will serve as the forward wheel unit in a transport condition and will have the transport towbar 90 connected thereto. The towbar 42 will be swung to its inoperative position as illustrated by dotted line configuration in FIG. 2, by removing one of the locking pins 43 and thereafter pivoting the towbar to its folded position. The implement may then be towed by the vehicle and will present a relatively narrow width dimension when in the transport condition.

From the foregoing description, it will be seen that I have provided a novel disc implement in which all of the earth working disc units may be readily adjusted to adjust the angulated relation thereof by a user without requiring the user to dismount from the tractor. The disc implement permits simultaneous adjustment of all of the disc units relative to the frame over a wide range of adjustment without requiring the frame itself to be adjusted.

The frame is of symmetrical configuration and is supported by suitable transport wheels which may be readily raised and lowered as desired. The side draft exerted by the implement during the earth working operation is completely balanced and this balanced condition is maintained even during adjustment of the implement units. The unique construction of each disc unit permits a self-sharpening and self-cleaning action to take place during the earth working operation.

Thus it will be seen that I have provided a novel disc implement which is more efficient and capable of a wider range of adjustment with respect to the disc units than any heretofore known comparable implement.

What is claimed is:

1. A disc implement comprising
   a generally rectangular frame having a width dimension substantially greater than the length dimension, and having sides and front and rear ends,
   a drawbar connected to said frame adjacent the front end thereof,
   a plurality of spaced apart elongate tool bar structures mounted on said frame and extending transversely of the frame and substantially normal to the length dimension of the frame,
   a plurality of elongate, vertically disposed spaced apart disc standards, and arranged in transverse rows with respect to said frame,
   means revolvably mounting each disc standard adjacent its upper end on one of said tool bar structures to permit revolving movement of each disc standard about its longitudinal vertically disposed axis,
   a plurality of earthworking concavo-convex discs each being mounted on one of said disc standards adjacent the lower end of the latter, each disc being movable with its associated disc standard to permit angular adjustment of the position of each disc, each disc being normally adjusted in an earthworking operation to dispose its axis of rotation in angular relation with respect to the longitudinal center line of the frame, the discs mounted on a tool bar structure and located on one side of the longitudinal center line of the frame, in an earth working operation, having their respective axes of rotation oppositely angled with respect to the axes of rotation of the discs located on the other side of the longitudinal center line of the frame,
   a plurality of motion transmitting links shiftably mounted on said frame for shifting movement relative thereto, each motion transmitted link positioned above and being connected with the disc standards mounted on a tool bar structure located on one side of the longitudinal center line of the frame, said links when shifted being operable to shift said disc standards about their longitudinal vertically oriented axes thereby selectively adjusting the respective angular positions of the axes of rotation of the discs with respect to the longitudinal center line of the frame,
   a pair of spaced apart actuating turntables revolvably mounted on said frame and each connecting a motion transmitting link for the disc standards located in a transverse row on one side of the longitudinal center line of the frame with a motion transmitting link for the disc standards in a transverse row located on the other side of the longitudinal center line of the frame,
   a pair of elongate connecting links each extending between and being connected with said actuating turntables,
   power means mounted on said frame and connected with said actuating turntables and being operable for rotating the same and simultaneously volving all of said disc standards,
   a pair of laterally spaced apart wheel assemblies each being positioned inwardly from the respective sides of the frame, each wheel assembly including a vertically disposed elongate wheel standard, means mounting each wheel standard on said frame for vertical translation relative to said frame between a lowered ground engaging position and an elevated position, said wheel standards when in an elevated position, positioning said discs in engagement with the ground, each wheel standard also being revolvable about its longitudinal vertically disposed axis through an arc of approximately 90° between first and second positions, said wheel assemblies when in the first position having their respective rotational axes disposed substantially normal to the length dimension of the frame, and when in said second position having their respective rotational axes disposed substantially normal to the width dimension of the implement frame,
   and means for releasably locking said wheel assemblies in said second position.

2. The disc implement as defined in claim 1 wherein said tool bar structure and the associated motion transmitting links are spaced apart in a front and rear direction, and a plurality of elongate connecting arms interconnecting adjacent front and rear spaced apart motion transmitting links.

3. The disc implement as defined in claim 1 wherein each disc standard is bent intermediate its ends, whereby the lower end portion of each disc standard is slightly angularly offset with respect to the remaining portion thereof.

* * * * *